May 10, 1966  N. V. BEAMAN  3,250,247
APPARATUS FOR GREASING BAKING PANS
Filed Sept. 26, 1963
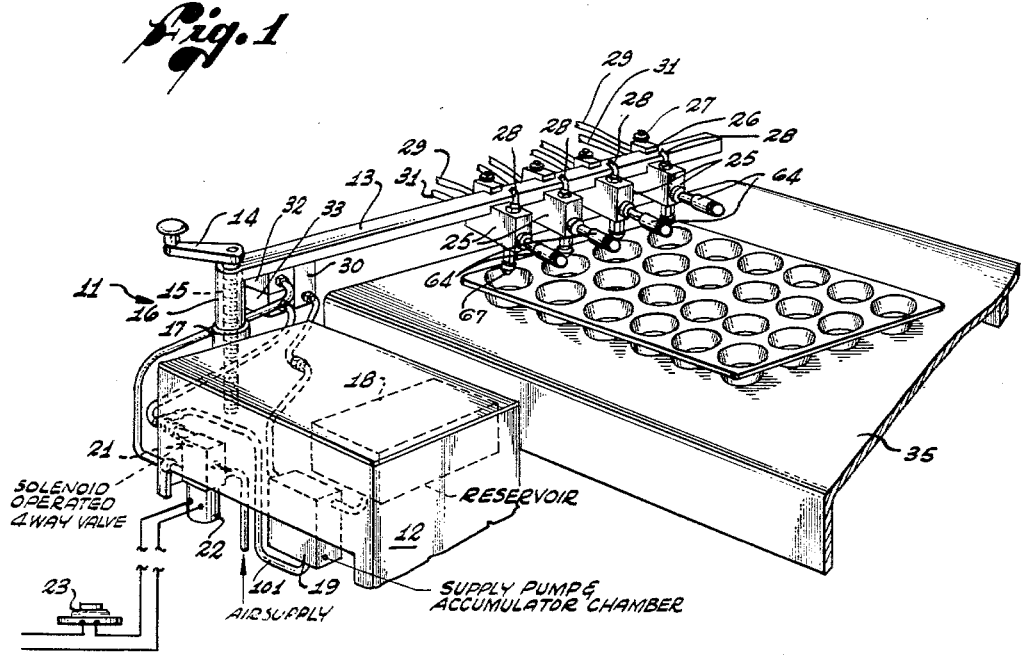
INVENTOR.
NORMAN V. BEAMAN
BY Forrest J. Lilly
ATTORNEY United States Patent Office 3,250,247
Patented May 10, 1966

3,250,247
APPARATUS FOR GREASING BAKING PANS
Norman V. Beaman, La Habra, Calif., assignor to Par-Way Mfg. Co., Los Angeles, Calif., a corporation of California
Filed Sept. 26, 1963, Ser. No. 311,777
4 Claims. (Cl. 118—317)

This application is a continuation-in-part of my prior copending application Serial No. 216,808 filed August 14, 1962.

The present invention relates generally to apparatus for coating with oil or grease the interior surfaces of pans for use in baking bread, muffins, cakes and like products in commercial bakeries. More particularly, the present invention relates to apparatus for coating baking pan interiors by a very fine spray of greasing liquid only, under high pressure and without air admixed therein.

In commercial bakery operations, it is standard practice to grease the inside surfaces of baking pans by applying a coating of oil or grease to prevent the baked product from sticking to the pan. In view of the large volume output of such bakeries, it is desirable to effect the greasing operation expeditiously and with moderate labor and to apply a thin, even coating to only those surfaces of the pans contacted by the baked product.

According to the present invention, the greasing operation preferably applies an oil or grease coating to the pan surfaces by a spray of greasing liquid under high pressure providing substantially uniform dispersion of the liquid in the form of tiny droplets which are sprayed in a single quick burst from a nozzle or nozzles spaced from the pan.

Further according to the present invention, it is desired to force-feed the oil or grease under substantially constant pressure to a delivery pump chamber from which it is ejected as a burst of spray from a nozzle and in which the supply of the greasing material is maintained without recirculation thereof as required in positive displacement supply pumps.

An additional feature of the invention is to speed up the single quick burst of the greasing spray by applying a hammer blow to the greasing material in the delivery pump chamber to effect ejection thereof.

It is, therefore, an object of the present invention to provide improved apparatus for rapidly and uniformly greasing the surfaces of baking pans by spraying a coating of oil or grease on the dough-contacting surfaces thereof.

Another object of this invention is the provision of an improved baking pan greasing apparatus in which oil is applied in the form of a quick burst of a dispersion of fine droplets, producing a substantially uniform surface coating.

A further object of the present invention is the provision of an improved pan greasing apparatus for spraying oil or grease in the form of a dispersion of fine droplets, in which the greasing material is fed to the spraying device under substantially constant pressure and without recirculation of the material.

A still further object of this invention is the provision of an improved baking pan greasing apparatus for spraying a dispersion of fine droplets of oil or grease on the dough-contacting surfaces of the pans, which supplies greasing material to a delivery pump chamber under substantially constant pressure without recirculation, and delivers to the material in the pump chamber substantially a hammer blow to effect a quick, short burst of the spray dispersion under high pressure.

These and other objects and features of the invention will be readily apparent to those skilled in the art from the following specification and the appended drawing, in which:

FIG. 1 is a perspective and partially diagrammatic view of an exemplary embodiment of the present invention; and
FIG. 2 is a sectional, partially diagrammatic view of the delivery, supply and control elements of the invention.

Referring first to FIG. 1, the pan greasing apparatus according to the present invention, indicated generally by the numeral 11, includes a cabinet portion 12 on which is supported a vertically adjustable and horizontally swingable supporting arm 13. The vertical position of the arm 13 is adjusted by a handle 14 attached to a lead screw 15 threaded in a hub 16 integral with the arm 13. The hub 16 is mounted for rotary motion in the bearing 17, and conventional indexing means, not shown, may be provided for the various regular positions of the arm 13.

Within the cabinet 12 are mounted an oil reservoir 18, a supply pump and accumulator chamber unit 19, and a conventional four-way valve 21 operated by a solenoid 22. The solenoid 22 is controlled by any desirable form of electric switch 23 which may be manually operated or automatically operated in synchronism with movement of baking pans as disclosed in my above-listed copending application.

A plurality of oil delivery pump and spray nozzle units 25 are clamped in adjusted positions along the arm 13 by clamping arms 26 secured by thumb nuts 27. The units 25 are supplied with oil through flexible tubes 28 which lead to an oil distributor 30 fed by the unit 19. A pair of flexible tubes 29 and 31 for each unit 25 are fed from individual distributors 32 and 33 selectively connected to the air supply and to atmosphere by the four-way valve 21.

The cabinet 12 may be stationarily mounted or may be supplied with a carriage, not shown, by which it may be moved from station to station. Likewise, the baking pans can be manually manipulated as in the case illustrated in the drawing in which muffin pans 34 are manually brought to, moved along and removed from a supporting table or platform 35. Alternatively, the spray apparatus of this invention may be associated with automatically fed pans, as disclosed in my aforesaid copending application.

Referring now to FIG. 2, the oil delivery pump and spray nozzle unit 25 shown in section therein comprises a main body portion 36, through the longitudinal axis of which extends a multi-diameter passage 37. The left-hand, largest diameter end of the passage 37 provides an air cylinder chamber 38. The adjacent intermediate diameter section of the passage 37 is threaded to receive a guide 39 for the delivery pump displacement piston 41. Guide 39 is sealed to the body 36 at 42 and to the oil delivery piston 41 by a sealing ring 43 in an end cap 44 threaded on the end of the guide. An air piston 45 is slidably mounted on the left-hand end of the delivery pump piston 41 and moves relative thereto between an end nut 46 and a collar 47 integral with the piston. The air piston 45 is sealed against the oil piston 41 by a sealing ring 48 and against the wall of cylinder 38 by a sealing ring 49. A molded nylon ring 51 is mounted in a complementary annular slot in the back face of the air piston 45 and acts as a shock absorber by engaging the inner face of a closing plate 52 for the chamber 38 in the return stroke of the air piston. The plate 52 is mounted on the main body 36 against a sealing gasket 54 by suitable studs 53.

The smallest diameter portion of the passage 37 forms the operating chamber 55 of the oil delivery pump. The right-hand, intermediate diameter end of the passage 37 has a hollow plug 56 threaded therein and sealed at 57. The plug 56 has a central chamber 58 therein in which is disposed a stop 59 for the delivery pump piston 41. The stop 59 is mounted on the inner end of an adjusting screw 61 and is sealed to the chamber 58 at 62. The adjusting screw 61 is threaded in an integral tube 63 extending from the hollow plug 56 and having a threaded passage therethrough communicating with the chamber 58. A thumb cap 64 is mounted on the outer end of screw 61 and telescopically receives the end of the tube 63. Adjustment of the cap 64 will vary the position of the stop 59 and, therefore, the stroke of the oil delivery piston 41 and the amount of oil ejected from the unit in each operation thereof.

Depending from the body 36 and threadedly mounted therein is a spray nozzle indicated generally at 65. This nozzle has a bore therethrough communicating by way of a passage 66 with the pump chamber 55. The nozzle 65 has a bottom opening 67 normally closed by a poppet 68 under the bias of a spring 69 which must be strong enough to withstand the oil supply pressure and maintain the poppet closed except when the pump is delivering a burst of oil spray from the nozzle. A light spring-biased check ball 71 is provided to close the passage 66 against gravity flow of oil from the chamber 55 if the nozzle 65 is removed from the unit. The structure and operation of the nozzles 65 are more particularly described and claimed in my aforesaid copending application.

A passage 72 communicates the supply tube 28 with the pump chamber 55. The tube fitting 73 communicating with the upper end of the passage 72 provides a ball socket which receives a check ball 74, spring biased thereagainst to permit flow of oil to supply the pump chamber 55 but acting to prevent backflow of the oil through the tube 28.

The air tube 29 is connected, by a passage 75 through the plate 52, to the left-hand end of chamber 38 to apply pressure to the working face of the air piston 45. The tube 31 communicates, by a passage 76 through the plate 52 and a passage 77 in the body portion 36, with the opposite end of the chamber 38 to apply pressure to the return face of the piston 45. The application of air pressure from the air supply to the tubes 29 and 31 is selectively controlled by the four-way valve 21 which also serves to connect the non-pressurized tube to exhaust to atmosphere.

Referring now to the supply pump and accumulator chamber unit 19, this comprises a central body portion 81 enclosing a pair of chambers 82 and 83 closed by a top plate 84 and a bottom plate 85 secured to the body portion 81 in sealable relation, as by studs 86. Within the chamber 82 is mounted a piston 87 sealed to the chamber wall at 88 and biased downwardly by a spring 89 in the chamber 82. The chamber 82 communicates through a passage 91 in the top plate 84 with an annular slot 92 forming a part of a multi-diameter passage 93 extending from an edge internally of the plate 84. The passage 93 communicates with a transverse passage 94 through the plate 84 which connects at its opposite ends to the tube 28 and the chamber 83.

A piston 95 is disposed in the chamber 83 and is sealed to the walls thereof at 96. The piston 95 is biased upwardly by a spring 97 in the chamber 83. A passage 98 through the bottom plate 85 connects the chamber 83 to atmosphere and a passage 99 through the plate 85 connects the bottom of chamber 82 by way of tube 101 to the tube supplying manifold 33 and tubes 31. Air pressure is thereby applied to the piston 87 at the same time that air pressure is applied to the return face of the piston 45.

Within the passage 93 is mounted a fitting 102 having a bore therethrough communicating with passage 93, and a side opening 103 communicating with the annular slot 92 and thence through the passage 91 to the chamber 82. The interior end of fitting 102 has a ball seat receiving a spring-biased check ball 104. A fitting 105 is threaded in the outside end of the fitting 102 and connects by way of a tube 106 with the oil reservoir 18. The interior end of the fitting 105 has a ball seat receiving a spring-biased check ball 107.

The operation of the pan greasing apparatus of this invention will now be described. The delivery pump and nozzle units 25 are mounted on the arm 13 in positions to spray, for example, an entire row of muffin cups in the muffin pan 34, as shown in FIG. 1 Their number and location will be selected to conform to any particular pan to be greased and any units which are not desired to effect a spray operation may be shut off by simply moving their stop 59 into engagement with the delivery piston 41 to prevent movement thereof when air pressure is applied to the piston 45. Likewise, the position and elevation of the arm 13 will be adjusted to the particular pans to be greased. It is assumed that the oil supply and delivery passages are filled with oil, any air therein having been bled therefrom in any conventional manner.

With the solenoid 22 de-energized, the four-way valve 21 will be in position to supply air pressure to the tube 31 and the return face of the air piston 45 so that the parts of unit 25 are in the position shown in FIG. 2. In this position of the valve, air pressure will also be supplied through tube 101 and passage 99 to chamber 82 beneath the piston 87 which tends to rise, overcoming the bias of spring 89, to apply pressure to the oil to the left of the check ball 107. Oil is free to flow past the check ball 104 into passages 93 and 94 and thence into chamber 83 and distributor 30. From distributor 30 it flows through tube 28, past the check ball 74, and through passage 72 into the pump chamber 55. The pressure developed in the oil by the piston 87 is sufficient, acting on the working face of piston 95, to overcome the bias of spring 97 so that oil will flow into the accumulator chamber 83 above the piston. While the accumulator chamber 83 is not filled to capacity, the pressure in the oil supply system will be substantially that resulting from the force exerted by spring 97. If the accumulator chamber 83 should become filled to the point where the piston 95 has no further downward movement, the pressure in the oil supply system becomes that exerted by the piston 87, while air pressure is applied to the piston, and reverts to the pressure supplied by spring 97 when the air pressure is released.

When the air pressure is released from the piston 87 by operation of the valve 21 to effect a spraying operation, the piston 87 moves downwardly under the bias of its spring 89 to pull an additional supply of oil into the chamber 82 from the reservoir 18 through the tube 106 past check ball 107, passage 103, annular slot 92 and passage 91. In this return movement of the piston 87, pressure in the supply system is maintained against check ball 104 by the force exerted by spring 97 on the piston 95 in the accumulator chamber 83.

When the valve 21 operates, the tubes 31 previously connected to the air supply are now connected to atmosphere, and the air supply is connected to the tubes 29 to supply air pressure to the left-hand side of chamber 38 against the working face of piston 45. The piston 45 thereby moves to the right, sliding over the delivery piston 41, and accumulates speed to hit the shoulder 47 a hammer blow to move the piston 41 abruptly into the pump chamber 55. This creates an immediate high pressure in the pump chamber against the check ball 74, and oil is ejected past the ball 71 and through the nozzle passage, opening the poppet 68 and spraying the oil under high pressure in a burst of uniformly dispersed fine droplets. The amount of oil ejected will be determined by the stroke of the delivery piston 41, this stroke being determined by the position of the stop 59. The hammer blow against the collar 47, which is, in turn, delivered by the delivery piston 41 to the oil within the chamber 55, insures against a slow build up of pressure in the pump chamber by creating a substantially instantaneous high pressure to effect a quick, sharp burst of spray from the nozzle.

Opening of switch 23 after a spraying operation de-energizes the solenoid 22 and the valve 21 moves back to the position where the tubes 31 and 101 are connected to the supply pressure and the tubes 29 connected to atmosphere. Air pressure in the chamber 38 on the return face of piston 45 moves it toward the left until it engages the end nut 46, whereupon it moves the oil delivery piston 41 toward the left until the nylon shock absorber 51 engages the interior surface of the end plate 52. As the oil delivery piston 41 moves out of the pump chamber 55, oil is supplied thereto to replace the amount ejected, the supply pressure in the oil system being maintained by spring 97 and piston 95. Air pressure to tubes 31 is also applied to piston 87 which moves upwardly in the chamber 82 to supply oil to the pump chamber 55 or to the accumulator chamber 83, or both.

It is, therefore, seen that the apparatus of the present invention provides for the substantially instantaneous application of delivery pressure in the delivery pump by the hammer blow imparted to the pump delivery piston and by it to the oil within the pump chamber. The pressure within the oil system supplying the delivery pump chamber is maintained substantially constant throughout the operating cycles of the apparatus by the supply pump and accumulator chamber unit 19, thereby permitting the location of the oil reservoir at any level. The constant supply pressure is maintained without requiring recirculation of the oil in the system and attendant deterioration of the physical properties thereof.

While certain preferred embodiments of the invention have been specifically illustrated and described, it will be understood the invention is not limited thereto, as many variations will be apparent to those skilled in the art, and the invention is to be given its broadest interpretation within the terms of the following claims.

I claim:

1. Apparatus for greasing baking pans comprising: means for supporting a baking pan with its baking surfaces exposed; a spray nozzle; a delivery pump having a chamber communicating with said nozzle; means for supplying greasing oil to said chamber; a delivery piston movable in said chamber to eject oil therefrom through said nozzle in a finely dispersed spray; means preventing return movement of the oil through said supply means; air actuated piston means for moving said delivery piston in said pump chamber; a lost-motion connection between said air actuated piston means and delivery piston, whereby said air actuated piston means moves relative to said delivery piston on initial operation to strike the delivery piston substantially a hammer blow to cause immediate, abrupt increase in the pressure of the oil in said pump chamber and abrupt, full-force ejection of oil from the nozzle, said supply means including a combined supply pump and accumulator chamber unit supplying oil at substantially constant pressure without recirculation thereof, said supply pump comprising a piston actuable by air pressure in a pumping direction and said accumulator chamber including a spring-loaded piston movable against its bias by the pumping pressure; means interconnecting said chambers to permit flow of oil therebetween in the pumping direction only; means connecting said accumulator chamber to the inlet to said delivery pump chamber so that the supply of oil to the delivery pump chamber will always be under a pressure not less than that exerted by the force of the biasing spring for the accumulator chamber piston; and means supporting said spray nozzle in position to direct the oil spray therefrom onto the baking surfaces of said pan.

2. Apparatus for greasing baking pans comprising: means for supporting a baking pan with its baking surfaces exposed; a spray nozzle; a delivery pump having a chamber communicating with said nozzle; means resiliently closing said nozzle to normally prevent passage of greasing oil therethrough; means for supplying oil to said chamber; a delivery piston movable in said chamber to eject oil therefrom through said nozzle in a finely dispersed spray; means preventing return movement of the oil through said supply means; air actuated piston means for moving said delivery piston in said pump chamber; a lost-motion connection between said air actuated piston means and delivery piston, whereby said air actuated piston means moves relative to said delivery piston on initial operation to strike the delivery piston substantially a hammer blow to cause immediate, abrupt increase in the pressure of the oil in said pump chamber and abrupt, full-force ejection of oil from the nozzle, said supply means including a combined supply pump and accumulator chamber unit spplying oil at constantly maintained pressure without recirculation thereof, said supply pump comprising a piston actuable by air pressure in a pumping direction and said accumulator chamber including a spring-loaded piston movable against its bias by the supply pumping pressure; means interconnecting said chambers to permit flow of oil therebetween in the pumping direction only; means connecting said accumulator chamber to the inlet to said delivery pump chamber so that the supply of oil to the delivery pumping chamber will always be under a pressure not less than that exerted by the force of the biasing spring for the accumulator chamber piston; means interconnecting a reservoir of oil to the supply pump chamber to permit flow of oil from the reservoir into the supply pump chamber but not in reverse direction, whereby upon return movement of the supply pump piston oil will be supplied to its chamber from the reservoir and prevented from returning thereto from the accumulaor chamber; and means supporting said spray nozzle in position to direct the oil spray therefrom onto the baking surfaces of said pan.

3. Apparatus for greasing baking pans comprising: means for supporting a baking pan with its baking surfaces exposed; a spray nozzle; a delivery pump having a chamber communicating with said nozzle; a delivery piston movable in said chamber to eject greasing oil therefrom through said nozzle in a finely dispersed spray; air actuated piston means for moving said delivery piston in said pump chamber; a combined supply pump and accumulator chamber unit supplying oil to said pump chamber at constantly maintained pressure without recirculation thereof, said supply pump comprising a piston actuable by air pressure in a pumping direction and said accumulator chamber including a spring-loaded piston movable against its spring bias by the supply pumping pressure; means for flowing oil from the supply pump chamber into the accumulator chamber; means connecting said accumulator chamber to the inlet to said delivery pump chamber so that the supply of oil to the delivery pumping chamber will always be under a pressure not less than that exerted by the force of the biasing spring for the accumulator chamber piston; and means supporting said spray nozzle in position to direct the oil spray therefrom onto the baking surfaces of said pan.

4. Apparatus for greasing baking pans comprising: means for supporting a baking pan with its baking surfaces exposed; a spray nozzle; a delivery pump having a chamber communicating with said nozzle; means resiliently closing said nozzle to normally prevent passage of greasing oil therethrough; means for supplying oil to said chamber; a delivery piston movable in said chamber to eject oil therefrom through said nozzle in a finely dispersed spray; means preventing return movement of the oil through said supply means; air actuated piston means for moving said delivery piston in said pump chamber, said supply means including a combined supply pump and accumulator chamber unit supplying oil at constantly maintained pressure without recirculation thereof; a four-way valve controllable to supply air pressure selectively to opposite sides of said air actuated piston means for spraying and return stroke movements of the delivery piston; an air operated piston in said supply pump; means connecting said supply pump piston to the return stroke line of said air actuated piston means to effect a supply pumping operation while the delivery piston is in its return position; and means supporting said spray nozzle in position to direct the oil spray therefrom onto the baking surfaces of said pan.

References Cited by the Examiner

UNITED STATES PATENTS

| | | | |
|---|---|---|---|
| 1,505,331 | 8/1924 | Gold | 239—453 |
| 1,934,296 | 11/1933 | Dorner | 239—88 |
| 2,071,237 | 2/1937 | Rupprecht. | |
| 2,499,621 | 3/1950 | Archer. | |
| 2,747,539 | 5/1956 | Peffer. | |
| 2,862,478 | 12/1958 | Staats | 103—38 X |
| 2,912,169 | 11/1959 | Peffer | 118—317 X |
| 3,090,350 | 5/1963 | Walters. | |

FOREIGN PATENTS 740,599   11/1932   France.

DANIEL BLUM, *Primary Examiner.*

EVERETT W. KIRBY, *Examiner.*